July 31, 1956 P. J. WIKER, JR 2,756,604
DRIVE BELTS
Filed Dec. 28, 1953 2 Sheets-Sheet 2
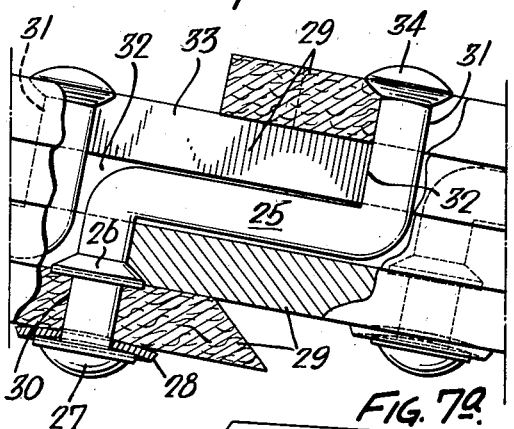
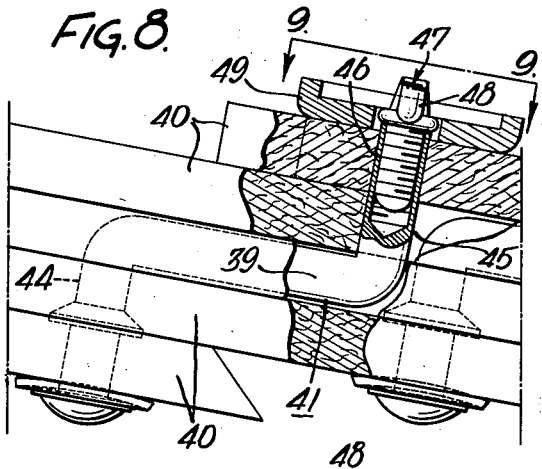
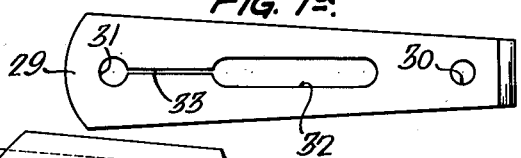
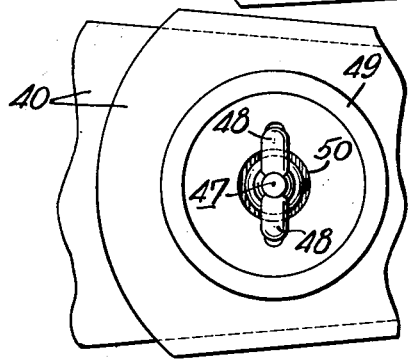
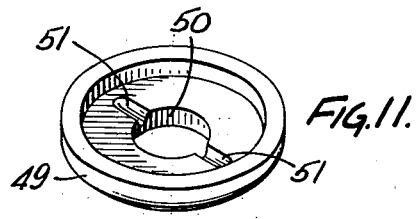
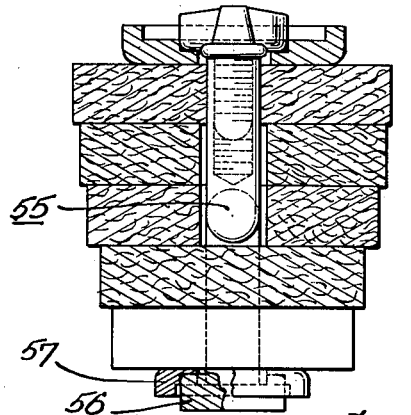
Inventor:
Park J. Wiker, Jr.
by his Attorneys
Howson & Howson United States Patent Office 2,756,604
Patented July 31, 1956

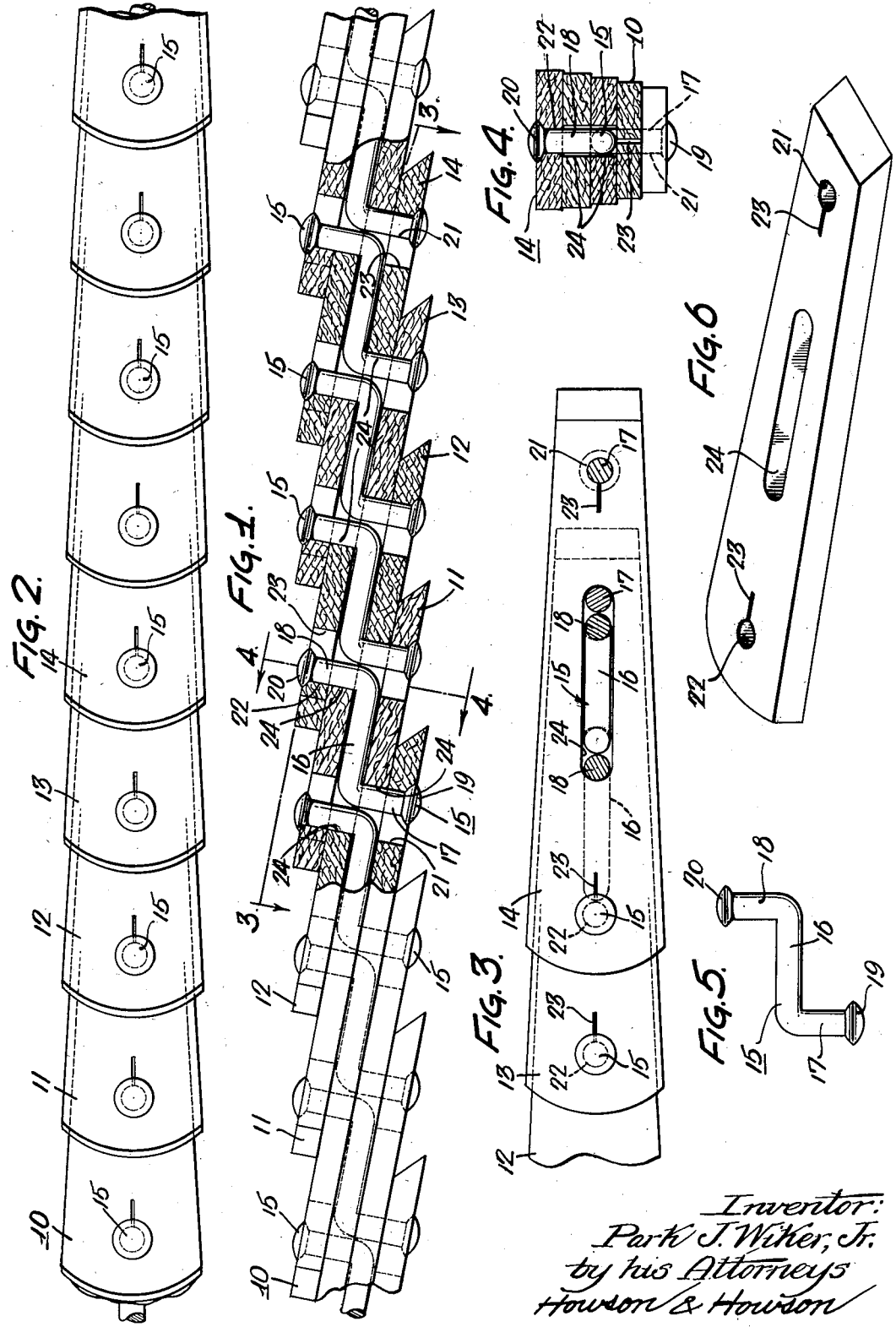

2,756,604

DRIVE BELTS

Park J. Wiker, Jr., Lancaster, Pa., assignor to Manheim Manufacturing and Belting Company, Manheim, Pa., a corporation of Pennsylvania Application December 28, 1953, Serial No. 400,422

4 Claims. (Cl. 74—233)

The present invention relates to driving belts and more specifically to laminated belts comprising a plurality of links secured in superimposed relation by suitable fastening means.

In belts of the type under consideration, flexible links are provided having a plurality of holes therein and a headed stud is secured through the ends of each link. The links are assembled in well known manner by passing the headed studs through the openings in adjacent links until the desired length of belting is formed. In conventional constructions, each stud passes through a selected number of links in accordance with the overall thickness desired in the belt. When the conventional belt is tensioned, the studs are canted and the rigid heads thereof tend to dig into the outermost links, thereby structurally weakening the links so that they break prematurely. In addition, in prior devices of this type, the studs go straight through the belt, thus engaging a minimum number of links of the laminated belt and increasing the tendency of the studs to tilt when the belt is under tension.

With the foregoing in mind, a principal object of the present invention is to provide a belt of the type described having novel connecting members for each link which will not assume an inclined position when the belt is under tension.

Another object of the present invention is to provide a novel drive belt of the type described in which the opposite end portions of the connecting stud elements are offset longitudinally of the belt and have an intermediate portion extending longitudinally of the belt so that the connecting elements engage a greater number of the overlapping links of the belt, increasing the tensile strength thereof.

A still further object of the present invention is to provide a drive belt having the features and characteristics set forth which is of relatively simplified construction, may be manufactured easily and cheaply and is entirely efficient and effective in operation and use.

These and other objects of the invention and the various features and details of the construction and operation thereof are more fully set forth hereinafter with reference to the accompanying drawings in which:

Fig. 1 is a side elevational view partially in section illustrating the novel construction of a belt made in accordance with the present invention;

Fig. 2 is a plan view of the belt illustrated in Fig. 1;

Fig. 3 is a longitudinal sectional view taken on the line 3—3 of Fig. 1;

Fig. 4 is a transverse sectional view taken on the line 4—4 of Fig. 1;

Fig. 5 is a detached elevational view of a fastening stud made in accordance with the present invention;

Fig. 6 is a detached perspective view of a link of the novel belt;

Fig. 7 is a fragmentary sectional view of a modified form of belt made in accordance with the present invention;

Fig. 7a is a thumbnail showing of a link illustrated in Fig. 7;

Fig. 8 is a fragmentary sectional view similar to Fig. 7 of a further modification of the present invention;

Fig. 9 is a fragmentary plan view taken on the line 9—9 of Fig. 8;

Figs. 10 and 11 are detached perspective views of elements shown in Figs. 8 and 9;

Fig. 12 is a side elevational view partially in section illustrating another modification of the present invention; and, Fig. 13 is a sectional view taken on the line 13—13 of Fig. 12.

Referring now to the drawings, and more particularly to the embodiment in Figs. 1 to 5 inclusive, the drive belt of the present invention comprises a series of overlapping relatively superimposed links, for example designated at 10, 11, 12, 13, and 14. The links are connected by studs 15, each having an intermediate portion 16 extending longitudinally of the drive belt and end portions 17 and 18 respectively, spaced apart longitudinally of the belt and substantially perpendicular to the intermediate portion 16.

As is clearly shown in Fig. 1 of the drawings, the end portions project in opposite directions through and beyond the adjacent and outermost links and terminate respectively in head portions 19 and 20 engaging the outermost links. Thus, the present form of link affords penetration of five links by each stud in a belt having a thickness corresponding to only four links.

To accommodate the novel connecting means of the present invention, each belt link is formed, for example as shown in Fig. 6. As shown, the link is of relatively constant thickness along its length, but tapers in width to provide a V-type cross section in the assembled belt, as is shown in Fig. 4. Adjacent each end of the link, an aperture is provided which is adapted to snugly receive the end portion of the stud 15. The apertures indicated at 21 and 22, are provided with adjoining longitudinal slots 23 which afford expansion of the apertures to permit passage of the heads 19 and 20 therethrough in assembly of the belt. Disposed intermediate the apertures 21 and 22 centrally of the link is an elongated longitudinal opening 24 which is dimensioned to snugly receive the intermediate portion 16 of the stud and retain it against lateral displacement relative to the link.

As shown in Fig. 1, each stud has its end portion 17 passing through the aperture 21 of the link 10, for example, and the trailing end of the opening 24 in the upwardly adjacent link 11. The central intermediate portion 16 of the stud is nested in the opening 24 of the next link 12, and the end portion 18 passes through the leading end of the opening 24 in the link 13 and the aperture 22 in the link 14. Thus, the stud passes through five links, and retains them in their relatively superimposed overlapping positions.

The intermediate portion 16 is held against lateral displacement by the snug fit thereof within the opening 24 of the link 12, and is held securely in the opening by the body portions of the adjacent links 11 and 13. The firm support for the intermediate portion 16 provided by the opening 24 and the adjacent links 11 and 13 prevents the stud from canting or tilting when the belt is placed under tension. Since the stud is held against angular displacement, there is no tendency for the head portions 19 and 20 to dig into the exposed faces of the outer links 10 and 14 respectively. Because of this construction, the link is not subject to rapid wear and the life of the belt is substantially prolonged.

A modified form of stud is disclosed in Fig. 7 wherein a stud 25 having the same general configuration as the stud 15 is provided adjacent one extremity with a shoulder 26 which bears against the interior face of the adjacent outer link. A washer or like bearing member 28 is positioned between the head 27 and the link and forms a seat upon which the head 27 bears. Thus, the link is firmly anchored between the shoulder 26 and the washer 28. The use of this modified form of stud requires a modification in the formation of the link members 29. In this form of the invention, each link member is provided with apertures 30 and 31 adjacent the respective ends of the link. A longitudinal opening 32 is disposed between the apertures 30 and 31 to receive the intermediate portion of the stud 25 (see Fig. 7a).

Since the head 27 is formed after assembly of the belt, the aperture 30 is not provided with a slot corresponding to the slot 23 of the previous embodiment. However, to afford ready assembly of the belt, the opening 32 is interconnected with the aperture 31 by a longitudinal slot 33. The slot 33 permits enlargement of the aperture 31 and the opening 32 for the passage of the head 34 of the stud. The shoulder 26 and the washer member 28 firmly anchor the innermost link 29 and assist in preventing angular displacement of the stud 25 when the belt is placed under tension. Thus, the stud does not tilt and there is little possibility of the head portions digging into the exposed surfaces of the belt and damaging the links.

Another embodiment of the invention is illustrated in Figs. 8 to 11 inclusive. According to this embodiment of the invention, a plurality of links 40 are held together by studs 41 having the same general configuration as the studs 15 and 25. Each stud has an intermediate portion 39, one end portion 44 having a head and a shoulder, as shown, and another end portion 45 which is bored and tapped as indicated at 46. The links 40 are held in position upon the stud 41 by a screw member 47 which is threaded into the tapped opening 46. The screw member 47 is provided with arm portions 48 extending at diametrically opposed directions and adapted, when the member is screwed into the opening 46, to engage upon the outer face of an underlying bearing member 49. The bearing member 49 is in the general form of a washer having an opening 50 therethrough for the end portion 45 of the stud.

The arm portions 48 of the member 47 rockably engage upon the upper surface of the bearing member 49 and it is noted that the opening 50 in the latter has a larger diameter than the end portion 45 of the stud 41 in order to provide clearance and permit the latter to rock or pivot angularly with respect to the bearing member. By this construction, when the belt is tensioned, if the end portion 45 is displaced to an inclined position relative to the link 40, the arm portions 48 rockably bear upon the bearing members 49 thereby permitting angular displacement of the end portion 45 while the bearing member maintains a position parallel to the underlying link 40. In this manner, the stud and the bearing are prevented from biting into the links if the stud becomes angularly inclined under tension of the belt.

In order to maintain the screw member 47 in position transversely of the belt and prevent the members from working loose and becoming unscrewed while the belt is in use, the outer face of each bearing member 49 may be provided with diametrically arranged elongated recesses 51 to receive and retain against accidental displacement the projecting arm portions 48 of the screw member 47. It is not necessary that the bearing members 49 be employed in the generally dished form illustrated in the figures and substantially flat bearing members may be used if desired. However, the dished form of bearing member shown herein provides a high degree of rigidity and durability in the use of the belt.

An alternate construction and arrangement for securing the elements of the belt together is shown in Figs. 12 and 13 of the drawings. In this construction, the connecting stud 55 has at one end an integral cross arm 56 instead of the conventional head portion. A bearing member 57 similar to the bearing member 49, is provided to cooperate with the cross member 56 in the same manner as described above in connection with the embodiment of Figs. 8 to 11 inclusive.

As shown in the various forms of the invention, the stud member is formed with an intermediate portion extending longitudinally of the belt and relatively spaced end portions projecting in respectively opposite directions substantially perpendicular to the links. The intermediate portion is snugly received in a recess in a link of the belt and is held against displacement therein by the adjacent links positioned at either side thereof. In this manner, the stud is maintained rigidly within the belt and there is little tendency for the stud to turn or tilt and damage to the links of the belt.

While particular embodiments of the invention have been herein illustrated and described, it is not intended to limit the invention to such disclosures, and changes and modifications may be made therein and thereto within the scope of the following claims.

I claim:

1. A laminated driving belt comprising a plurality of links arranged in superimposed successive overlapping relation, each of said links having an elongated opening extending longitudinally therein, fastening means extending through the overlapping portions of the links comprising a stud element having an intermediate portion extending parallel to the links longitudinally of the belt in said elongated opening in an intermediate one of said links, and having opposite end portions spaced apart longitudinally of the belt and extending in respectively opposite directions substantially perpendicular to said intermediate portion and the links, said end portions of the stud projecting through and beyond the outermost links, and means at the free end of each said end portion respectively engaging the outermost links to secure said plurality of links together.

2. A driving belt according to claim 1 wherein said intermediate portion of the fastening means engages flush against the links at the opposite sides of said one link to be confined in said elongated opening of the one link by said links at the opposite sides thereof.

3. A laminated driving belt comprising a plurality of links arranged in superimposed successive overlapping relation, each of said links having an elongated opening extending longitudinally therein and apertures located endwise adjacent said elongated opening, fastening means extending through the overlapping portions of at least three links comprising a stud element having an intermediate portion extending parallel to the links longitudinally of the belt in said elongated opening in the intermediate one of said links, and having opposite end portions spaced apart longitudinally of the belt and extending in respectively opposite directions substantially perpendicular to said intermediate portion and the links, said end portions of the stud projecting through and beyond said apertures in the outer links, and means at the free end of each said end portion respectively engaging the outer links to secure said three links together.

4. A laminated driving belt comprising a plurality of links arranged in superimposed successive overlapping relation, each of said links having an elongated opening extending longitudinally therein and apertures located endwise adjacent said elongated opening, fastening means extending through the overlapping portions of at least five links comprising a stud element having an intermediate portion extending parallel to the links longitudinally of the belt in said elongated opening in the central one of said links, and having opposite end portions spaced apart longitudinally of the belt and extending in respectively opposite directions substantially perpendicular to said intermediate portion and the links, said end portions of the stud projecting through and beyond said openings in the adjacent intermediate links and said apertures in the outer links, and means at the free end of each said end portion respectively engaging the outer links to secure said five links together.

References Cited in the file of this patent

UNITED STATES PATENTS

| | | |
|---|---|---|
| 2,639,622 | Ginder | May 26, 1953 |
| 2,710,544 | Whittle | June 14, 1955 |

FOREIGN PATENTS

| | | |
|---|---|---|
| 523,337 | Great Britain | July 11, 1940 |
| 562,910 | Great Britain | July 20, 1944 |